US012503885B2

(12) United States Patent
Wang et al.

(10) Patent No.: US 12,503,885 B2
(45) Date of Patent: Dec. 23, 2025

(54) TOOL-ADJUSTABLE ELECTRONIC DEVICE LOCKING APPARATUS

(71) Applicant: SINOX CO., LTD, New Taipei (TW)

(72) Inventors: Chia-Hung Wang, New Taipei (TW); Chia-Ming Wu, New Taipei (TW)

(73) Assignee: Sinox Co., Ltd., New Taipei (TW)

( * ) Notice: Subject to any disclaimer, the term of this patent is extended or adjusted under 35 U.S.C. 154(b) by 321 days.

(21) Appl. No.: 17/811,449

(22) Filed: Jul. 8, 2022

(65) Prior Publication Data

US 2023/0243191 A1 Aug. 3, 2023

(30) Foreign Application Priority Data

Jan. 28, 2022 (TW) ................................. 111104062

(51) Int. Cl.
*E05B 73/00* (2006.01)
*E05B 37/02* (2006.01)

(52) U.S. Cl.
CPC .......... *E05B 73/0082* (2013.01); *E05B 37/02* (2013.01)

(58) Field of Classification Search
CPC .. E05B 73/0082; E05B 37/02; E05B 63/0056; E05B 73/0005; E05B 67/003
USPC ......................................................... 70/278.2
See application file for complete search history.

(56) References Cited

U.S. PATENT DOCUMENTS 3,875,645 A * 4/1975 Tucker ............... B23K 37/0408 D8/51
4,671,718 A * 6/1987 Eakin ....................... B21J 15/42 81/177.85
5,493,878 A * 2/1996 Murray, Jr. ......... E05B 73/0082 70/57
5,803,689 A * 9/1998 Magnus .............. E21B 41/0007 411/21
5,913,907 A * 6/1999 Lee ..................... E05B 73/0005 70/57
6,006,557 A * 12/1999 Carl .................... E05B 73/0005 70/57
6,058,744 A * 5/2000 Ling ..................... E05B 37/025 70/312

(Continued)

FOREIGN PATENT DOCUMENTS

AU 2010253755 A1 * 1/2012 ............. E05B 73/00
CN 208416201 U 1/2019

(Continued)

*Primary Examiner* — Steven A Tullia
(74) *Attorney, Agent, or Firm* — Rosenberg, Klein & Lee

(57) ABSTRACT

A tool-adjustable electronic device locking apparatus is configured to secure an electronic device and has a housing, an anti-theft-hole fixing member configured to be inserted into an anti-theft hole of the electronic device, a stage adjusting mechanism, and a driving mechanism. The stage adjusting mechanism includes a tool operated portion operated to adjust working stages. The driving mechanism selectively unfolds the anti-theft-hole-fixing member to engage in the anti-theft hole based on a current one of the working stages. The working stages are adjusted through a tool by setting the tool operated portion on the stage adjusting mechanism, so as to prevent the working stages from being changed accidentally, ensure that the working stage is kept the same when the tool-adjustable electronic device locking apparatus is used on the same electronic device, and ensure an anti-theft effect.

5 Claims, 15 Drawing Sheets

(56) References Cited

U.S. PATENT DOCUMENTS 6,227,017 B1 * 5/2001 Igelmund ............ E05B 73/0005 70/58
6,463,770 B1 * 10/2002 Lee ..................... E05B 73/0082 70/426
6,470,718 B1 10/2002 Yang
6,629,440 B1 10/2003 Meekma et al.
6,672,117 B2 * 1/2004 Yu ......................... E05B 67/003 70/333 R
6,779,370 B2 * 8/2004 Bellow, Jr. .......... E05B 73/0082 403/348
6,918,272 B1 * 7/2005 Sanders .............. E05B 73/0005 70/58
6,986,678 B1 * 1/2006 Di-Nardo ............... H01R 13/20 439/372
7,129,841 B2 10/2006 Feibelman
7,234,326 B1 * 6/2007 Lu ....................... E05B 73/0082 70/57
7,441,426 B2 * 10/2008 Avganim ............ E05B 73/0082 70/30
8,042,366 B2 * 10/2011 Mahaffey ................ E05B 73/00 403/360
8,720,874 B2 * 5/2014 Tschida ................. F16B 19/109 269/48.1
8,842,422 B2 * 9/2014 Hung .................. E05B 73/0005 361/679.01
9,273,496 B2 * 3/2016 Theobald ............ E05B 73/0005
10,907,378 B2 * 2/2021 Su ....................... E05B 73/0005
11,236,529 B2 * 2/2022 Tse ........................ G06F 1/1656
11,808,061 B2 * 11/2023 Yang ................... E05B 73/0082
11,933,077 B2 * 3/2024 Su ....................... E05B 73/0005
12,012,784 B2 * 6/2024 Yang ................... E05B 73/0005
2007/0295040 A1 * 12/2007 Lee ........................ A47F 7/024 70/58
2010/0300158 A1 * 12/2010 Andres ............... E05B 73/0082 70/58
2012/0312056 A1 12/2012 Yu et al.
2014/0069153 A1 * 3/2014 Wu ..................... E05B 73/0082 70/58
2014/0126230 A1 5/2014 Burcham
2018/0363334 A1 * 12/2018 Wu ..................... E05B 73/0005
2020/0080346 A1 * 3/2020 Wu ..................... E05B 73/0082
2020/0173203 A1 * 6/2020 Avganim ............ E05B 73/0005
2021/0025200 A1 * 1/2021 Wu ..................... E05B 73/0082
2022/0127882 A1 * 4/2022 Wu ..................... E05B 47/0012
2022/0170297 A1 * 6/2022 Kao .................... E05B 73/0082
2022/0235585 A1 * 7/2022 Wu ..................... E05B 73/0005
2022/0235586 A1 * 7/2022 Pan .......................... E05B 37/02
2023/0135591 A1 * 5/2023 Yang ................... E05B 73/0082 70/51
2023/0228128 A1 * 7/2023 Wang .................. E05B 73/0082 70/58
2023/0228129 A1 * 7/2023 Wang .................. E05B 73/0082 70/58
2023/0243191 A1 * 8/2023 Wang .................. E05B 63/0056 70/58
2023/0399876 A1 * 12/2023 Wu ..................... E05B 73/0082

FOREIGN PATENT DOCUMENTS

CN 111255309 A * 6/2020 ......... E05B 37/0034
CN 211201482 U * 8/2020 ......... E05B 73/0082
CN 215108167 U * 12/2021 ......... E05B 73/0005
DE 202022100192 U1 * 3/2022 ............. E05B 37/02
DE 202023103178 U1 * 9/2023 ............. E05B 47/00
EP 1811109 A2 * 7/2007 ......... E05B 73/0082
FR 2962472 A3 * 1/2012 ............. E05B 37/02
JP 2007154520 A * 6/2007 ............. E05B 73/00
JP 3170730 U * 9/2011 ............. E05B 37/02
JP 2022106835 A * 7/2022 ......... E05B 73/0082
KR 1020130131694 A 12/2013
TW 201408854 A 3/2014
TW M600329 U * 8/2020 ............. E05C 19/12
TW 202130893 A 8/2021
TW I737524 B 8/2021
TW M619423 U 11/2021
WO WO-2010138847 A2 * 12/2010 ............. E05B 73/00
WO WO-2018027061 A1 * 2/2018 ......... E05B 73/0082
WO WO-2021157355 A1 * 8/2021 ......... E05B 73/0082

* cited by examiner

TOOL-ADJUSTABLE ELECTRONIC DEVICE LOCKING APPARATUS

BACKGROUND OF THE INVENTION

1. Field of the Invention

The present invention relates to a locking apparatus for an electronic device, especially to a locking apparatus for a laptop computer.

2. Description of the Prior Art(s)

A conventional electronic device, especially a portable electronic device such as a laptop computer, usually has an anti-theft hole that is used along with a specific lock such as a laptop lock, so as to lock the laptop computer at a specific location and prevent the laptop computer from being stolen.

Anti-theft holes of conventional laptop computers are available in at least three different sizes (widths). Accordingly, manufacturers also develop multi-stage adjustable locks that can be adjusted to a proper stage, so as to be locked in the anti-theft hole of the conventional laptop computer.

A conventional multi-stage adjustable lock, regardless of stepped type (such as three-stage typed) or stepless type, is inserted into the anti-theft hole of the laptop computer with two hooks when in use, and then working stage of the conventional multi-stage adjustable lock is switched (such as by turning a knob) to unfold the two hooks to engage in the anti-theft hole. Afterwards, depending on type of the lock, by pulling out a key from a key lock or scrambling sequence of numbers of a combination lock, the two hooks are unable to be folded and leave the anti-theft hole, such that the multi-stage adjustable lock is fixed on the laptop computer.

However, in most of the usage scenarios, a user uses the lock in the anti-theft hole of the same size of the same laptop computer. Therefore, after the working stage is adjusted at the first use of the lock, there is usually no need to change the working stage. However, the lock is usually exposed and is mounted beside the portable electronic device such as the laptop computer. Consequently, a mechanism for adjusting the working stage may be inevitably touched accidentally. It is even more so when the lock is not in use. Most of the locks are carried around and it is inevitable that the mechanism for adjusting the working stage of the lock put in a bag would be touched by various articles, causing the working stage being changed and inconvenience of next use.

In addition, when the lock is locked, if the working stage can be easily adjusted to fold the hooks, the lock would detach from the laptop computer. Thus, the lock with easily adjustable working stages has low anti-theft effect.

To overcome the shortcomings, the present invention provides a tool-adjustable electronic device locking apparatus to mitigate or obviate the aforementioned problems.

SUMMARY OF THE INVENTION

The main objective of the present invention is to provide a tool-adjustable electronic device locking apparatus that is configured to secure an electronic device having an anti-theft hole. The tool-adjustable electronic device locking apparatus has a housing, an anti-theft-hole-fixing member, a stage adjusting mechanism, and a driving mechanism. The anti-theft-hole-fixing member protrudes out of the housing and is configured to be inserted into the anti-theft hole of the electronic device. The stage adjusting mechanism is configured to adjust the electronic device locking apparatus to multiple working stages and includes a tool operated portion. The tool operated portion is exposed to an outside of the housing and is operated to adjust the working stages to which the stage adjusting mechanism adjusts through a tool. The driving mechanism is connected with the anti-theft-hole-fixing member and the stage adjusting mechanism, and selectively unfolds the anti-theft-hole-fixing member to engage in the anti-theft hole based on a current one of the working stages to which the stage adjusting mechanism adjusts.

The working stages are adjusted through the tool by setting the tool operated portion on the stage adjusting mechanism. In this way, various kinds of touches can be effectively avoided, so as to prevent the working stages from being changed accidentally and ensure that the working stage is kept the same when the tool-adjustable electronic device locking apparatus is used on the same electronic device. Moreover, since it is not easy to adjust the working stages, the tool-adjustable electronic device locking apparatus can also be avoided being adjusted easily and losing an anti-theft effect.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
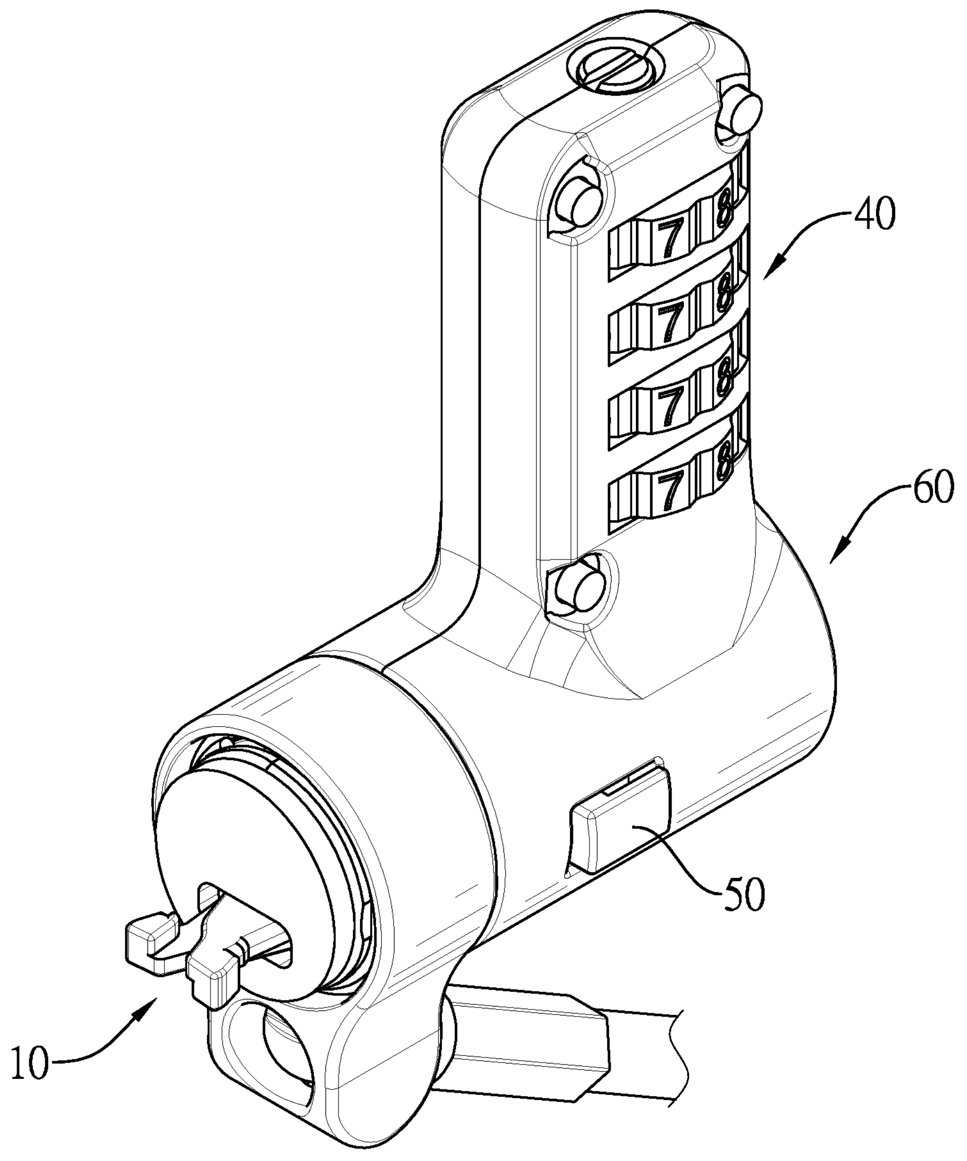
FIG. 1 is a perspective view of a first embodiment of a tool-adjustable electronic device locking apparatus in accordance with the present invention.
Figure 2:
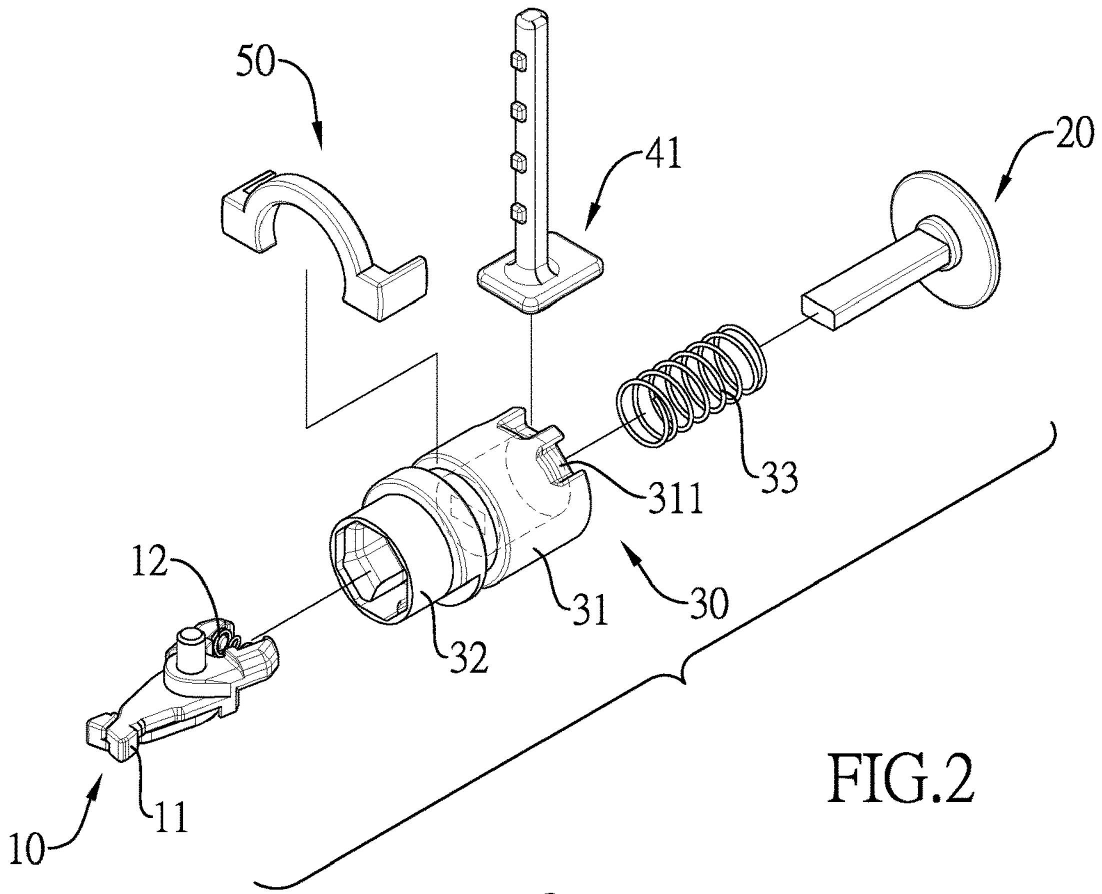
FIGS. 2 and 3 are partial exploded perspective views of the first embodiment of the electronic device locking apparatus in FIG. 1.

With reference to FIGS. 1 and 2, a tool-adjustable electronic device locking apparatus in accordance with the present invention is configured to secure an electronic device. The electronic device has an anti-theft hole. The tool-adjustable electronic device locking apparatus comprises a housing 60, an anti-theft-hole-fixing member 10, a stage adjusting mechanism 20, and a driving mechanism 30 and may be used along with a lock 40. The electronic device is preferably a portable electronic device, and specifically may be, but is not limited to, a laptop computer.

Figure 4:
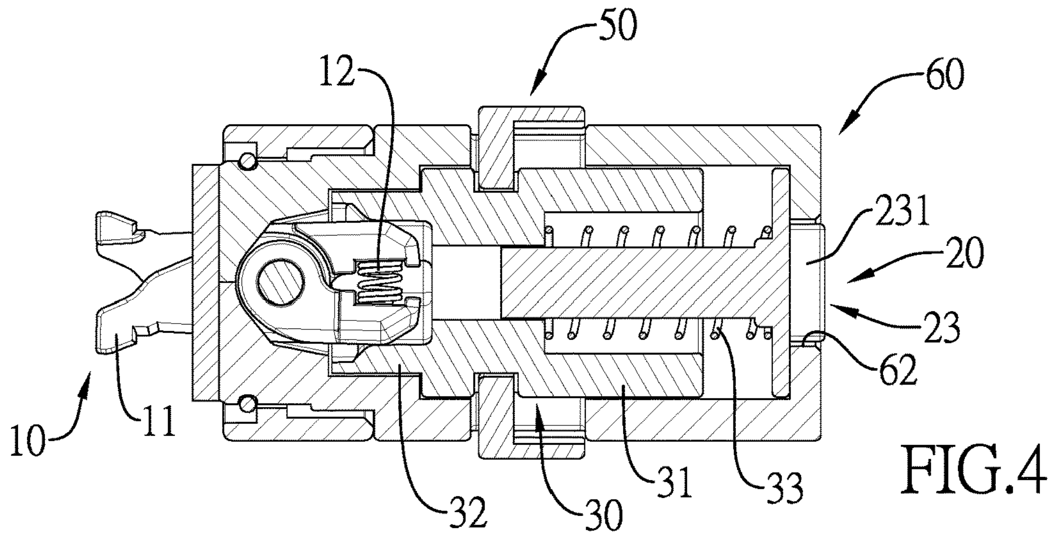
FIGS. 4 to 6 are operational cross-sectional top views of the first embodiment of the electronic device locking apparatus in FIG. 1.

With reference to FIGS. 2 and 4, the anti-theft-hole-fixing member 10 protrudes out of the housing 60 and is configured to be inserted into the anti-theft hole of the electronic device. In the preferred embodiments, the anti-theft-hole-fixing member 10 includes two hooks 11 and a hook resilient element 12. The two hooks 11 are pivotally connected with each other. The hook resilient element 12 connects the two hooks 11, so as to unfold or fold the two hooks 11 in a normal state. However, a structure of the anti-theft-hole-fixing member 10 is not limited to the structure as described above.

With reference to FIGS. 2 to 4 and 7, the stage adjusting mechanism 20 is configured to adjust the electronic device locking apparatus to multiple working stages and may adjust in a stepped or stepless manner. In different working stages, the anti-theft-hole-fixing member 10 is unfolded to different degrees, such that the anti-theft-hole-fixing member 10 is available for engaging in the anti-theft holes of different sizes. The stage adjusting mechanism 20 includes a tool operated portion 23. The tool operated portion 23 is exposed to, but not necessarily protrudes to, an outside of a housing 60. The tool operated portion 23 may be operated to adjust the working stages to which the stage adjusting mechanism 20 adjusts through a tool.

The driving mechanism 30 is connected with the anti-theft-hole-fixing member 10 and the stage adjusting mechanism 20 and selectively unfolds the anti-theft-hole-fixing member 10 to engage in the anti-theft hole based on a current one of the working stages to which the stage adjusting mechanism 20 adjusts.

When the lock 40 is locked, the stage adjusting mechanism 20 is fixed at the current one of the working stages by the lock 40 directly or indirectly. That is, the anti-theft-hole-fixing member 10 is unable to be switched to other working stages or be folded.

In the present invention, the following four embodiments are used to illustrate variations of the tool operated portion 23 of the stage adjusting mechanism 20.

Figure 3:
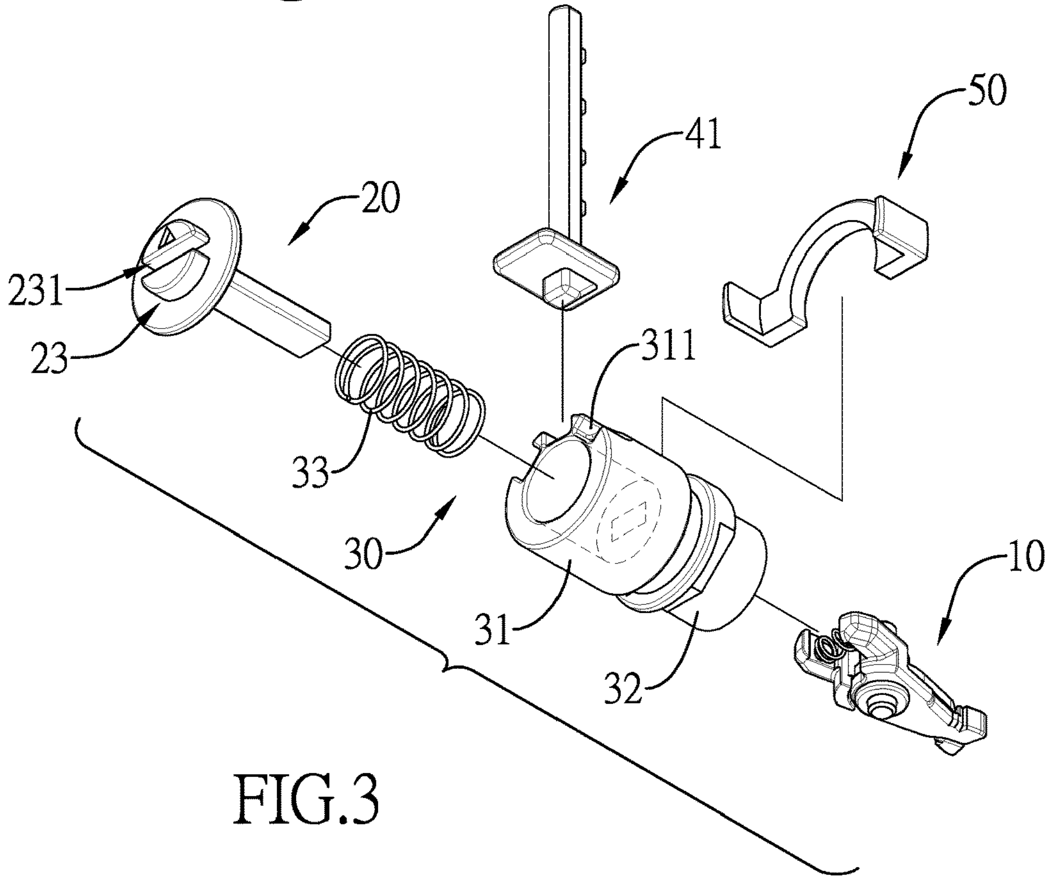

With reference to FIGS. 1 to 8, in a first embodiment of the present invention, the housing 60 has an operating hole 62 as shown in FIG. 4. The tool operated portion 23 corresponds in position to the operating hole 62 and does not protrude out from the operating hole 62. In addition, an axial direction and a radial direction that are perpendicular to each other are defined on the housing 60. The tool operated portion 23 and the anti-theft-hole-fixing member 10 are disposed on two opposite ends, which are defined along the axial direction, of the housing 60. Consequently, the operating hole 62 is also disposed on one of the ends, which are defined along the axial direction, of the housing 60. The axial direction is parallel with a direction along which the anti-theft-hole-fixing member 10 is inserted, and is not to limit the housing 60 to be cylindrical or tubular. Moreover, the way the tool operated portion 23 is operated by the tool is by being turned by the tool. Last, a recess 231 is formed in the tool operated portion 23 and is for the tool to be inserted in the recess 231, so as to allow the tool to operate (rotate) the tool operated portion 23, as shown in FIG. 3. In the first embodiment, the recess 231 is, but is not limited to, a slot that allows the tool operated portion 23 to be operated by a flat-bladed screwdriver.

With reference to FIGS. 2 to 4 and 7, in the first embodiment, the driving mechanism 30 includes a central shaft 31. When the central shaft 31 is moved toward the anti-theft-hole-fixing member 10, the anti-theft-hole-fixing member 10 is unfolded to engage in the anti-theft hole based on the current one of the working stages to which the stage adjusting mechanism 20 adjusts. The central shaft 31 is not limited to be shaped into a thin rod and may also be shaped in various shapes such as cylinder. The central shaft 31 may move to directly push and unfold the anti-theft-hole-fixing member 10, or the central shaft 31 may push and unfold the anti-theft-hole-fixing member 10 indirectly via other components.

Figure 5:
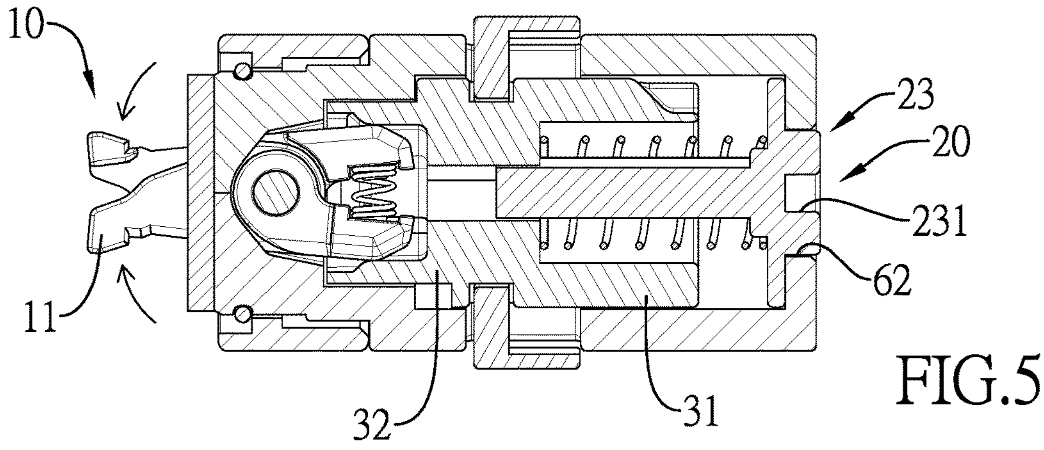
Figure 6:
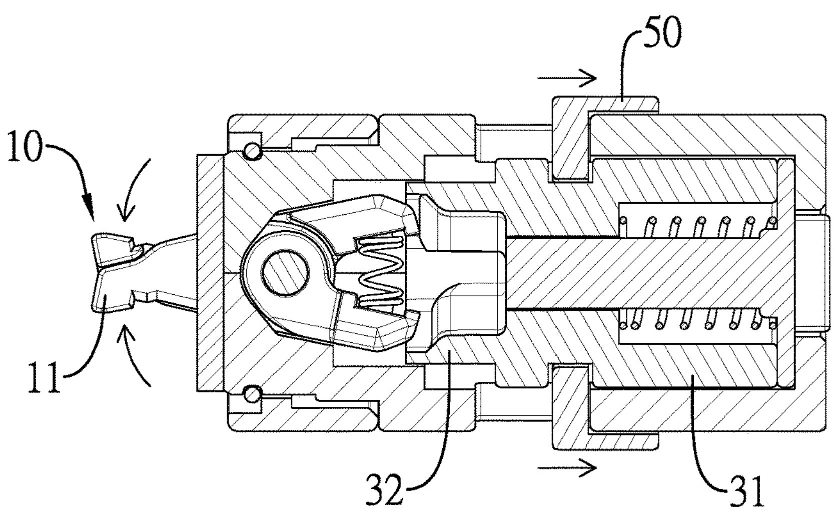
Figure 7:
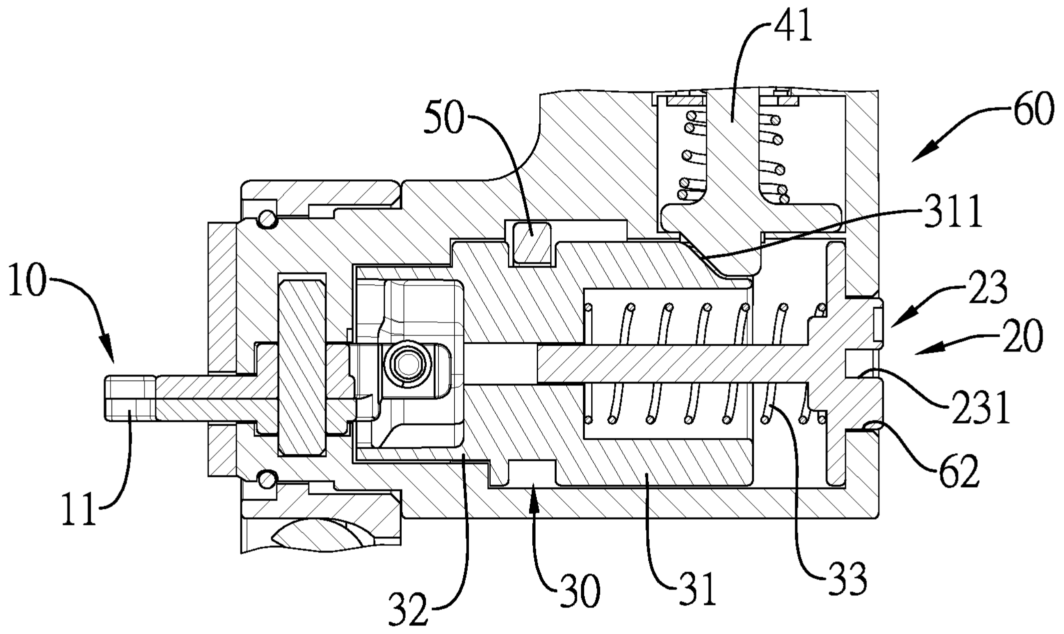
FIGS. 7 and 8 are operational cross-sectional side views of the first embodiment of the electronic device locking apparatus in FIG. 1.
Figure 8:
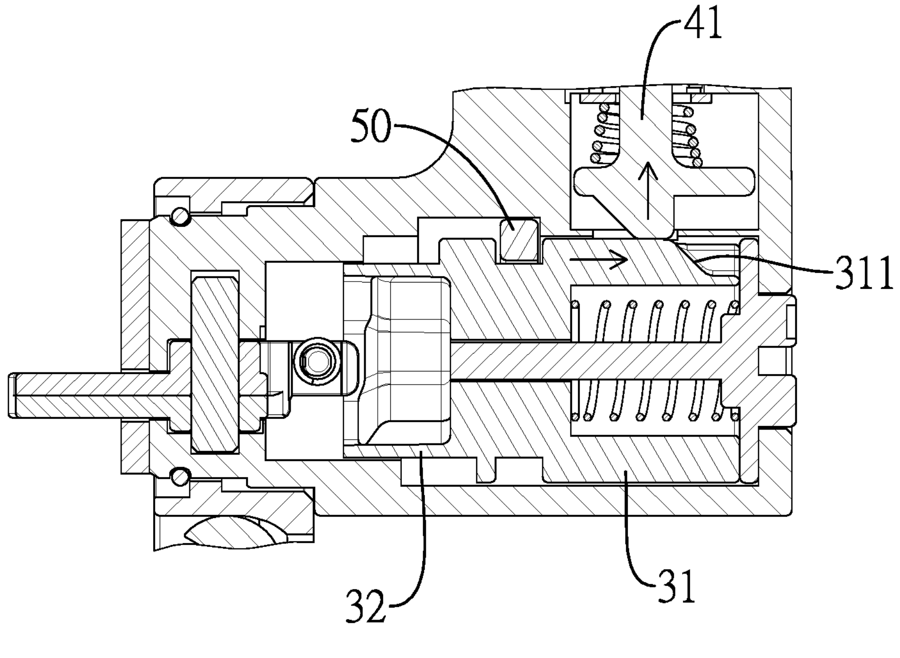
Figure 9:
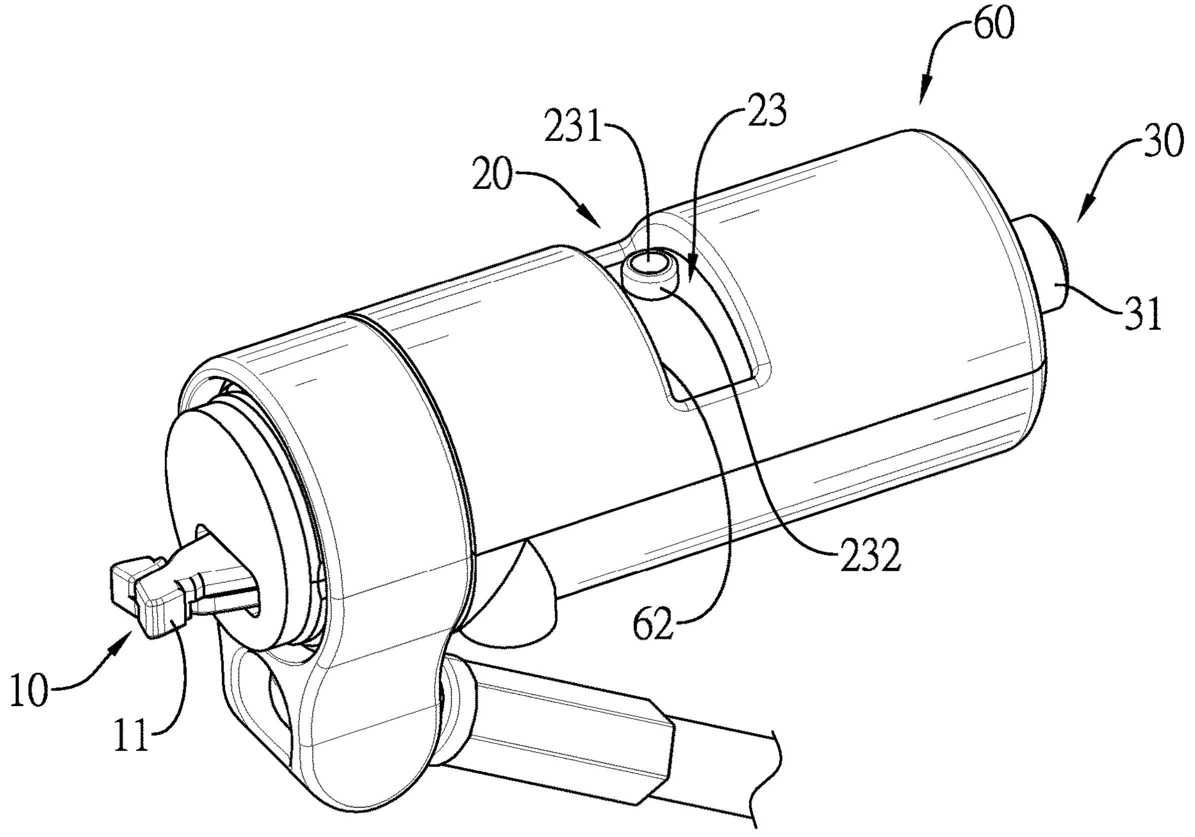
FIG. 9 is a perspective view of a second embodiment of a tool-adjustable electronic device locking apparatus in accordance with the present invention.

In the first embodiment, the driving mechanism 30 further includes a rotating member 32 disposed between the central shaft 31 and the anti-theft-hole-fixing member 10 and connected with the stage adjusting mechanism 20. The stage adjusting mechanism 20 is rotated to the different working stages with the tool, so as to rotate the rotating member 32 to different angles, as shown in FIGS. 5 and 6. When the central shaft 31 is moved to the anti-theft-hole-fixing member 10, the central shaft 31 pushes the rotating member 32 to push and unfold the anti-theft-hole-fixing member 10 to a corresponding one of the angles based on the current one of the working stages to which the stage adjusting mechanism 20 adjusts. Preferably, the rotating member 32 is a sleeve and has an opening facing toward the anti-theft-hole-fixing member 10 and mounted around an inner end of the anti-theft-hole-fixing member 10. Different inner diameters formed in the rotating member 32 allow the two hooks 11 to be unfolded to different degrees of expansion. However, a structure of the rotating member 32 is not limited to the structure as described above. In the first embodiment, the central shaft 31 and the rotating member 32 are, but are not limited to be, formed as a single part.

The central shaft 31 tends to move toward the anti-theft-hole-fixing member 10. Specifically, the driving mechanism 30 further includes a central shaft resilient element 33 pushing the central shaft 31. The tool-adjustable electronic device locking apparatus further comprises an unlocking member 50 connected with the central shaft 31 and selectively driving the central shaft 31 to move away from the anti-theft-hole-fixing member 10.

In the first embodiment, the unlocking member 50 radially protrudes out of the housing 60. With reference to FIGS. 5 to 8, when unlocking, by directly pulling the unlocking member 50 to move away from the anti-theft-hole-fixing member 10, the central shaft 31 and the rotating member 32 can be moved away from the anti-theft-hole-fixing member 10 together. Since the angle of the rotating member 32 is not interfered with when unlocking, the working stage is still the same when relocking.

In the first embodiment, with reference to FIGS. 2, 3, 7, and 8, the central shaft 31 has multiple rotating-stopping portions 311 formed on the central shaft 31 and corresponding in position to an engaging member 41 of the lock 40. Each of the rotating-stopping portions 311 of the central shaft 31 is preferably formed as a recess. When the lock 40 is locked, the engaging member 41 is non-retractable. Except for stopping the central shaft 31 from moving away from the anti-theft-hole-fixing member 10, the engaging member 41 also works along with the rotating-stopping portion 311 of the central shaft 31 to stop the central shaft 31 and the rotating member 32 from rotating. Thus, the anti-theft-hole-fixing member 10 is unable to be switched to the other working stages and is unable to be folded.

With reference to FIGS. 9 to 16, a second embodiment of the present invention is shown and is similar to the first embodiment. The main differences therebetween are as follows.

Figure 12:
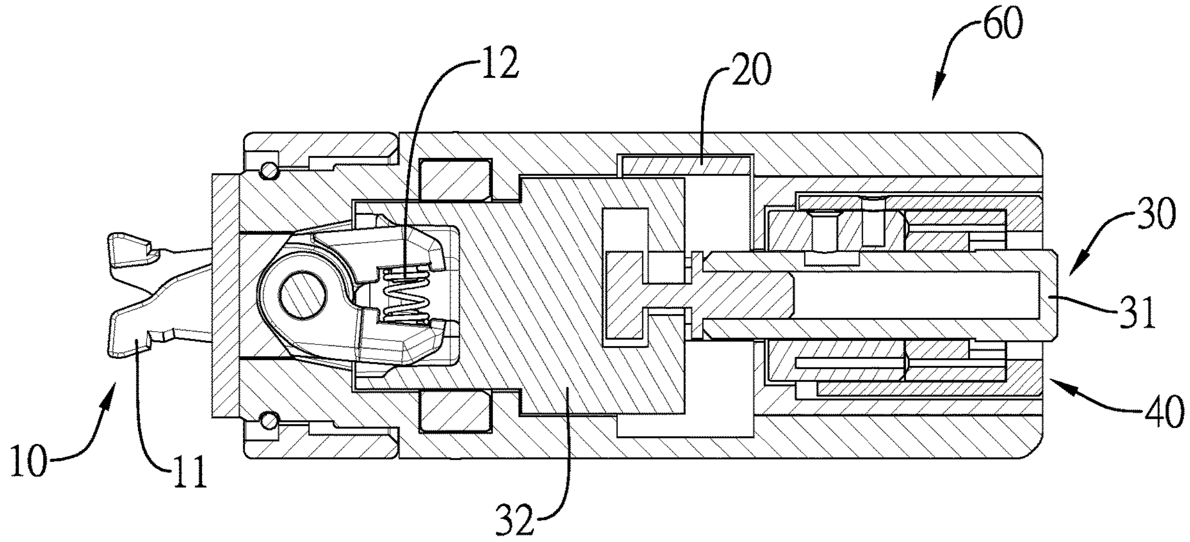
FIGS. 12 and 13 are operational cross-sectional top views of the second embodiment of the electronic device locking apparatus in FIG. 9.
Figure 13:
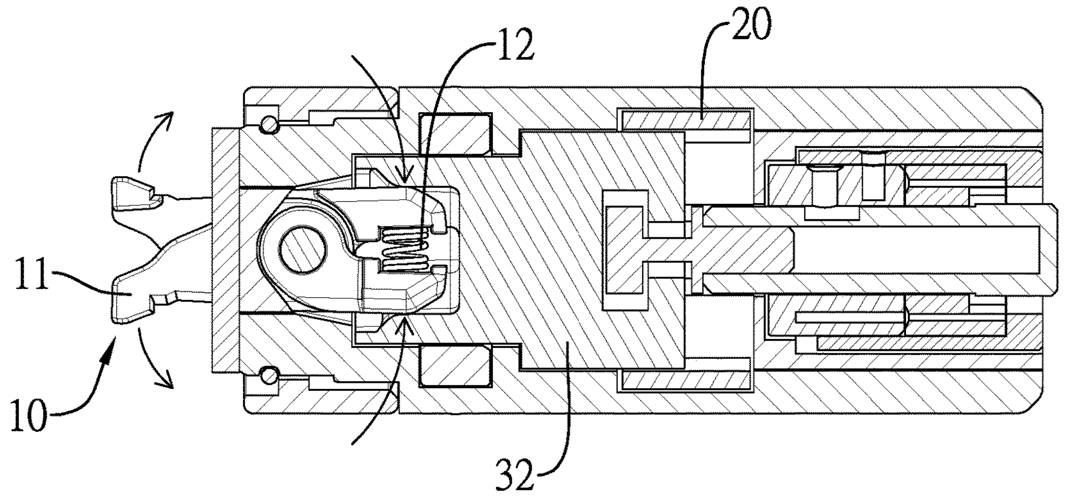
Figure 14:
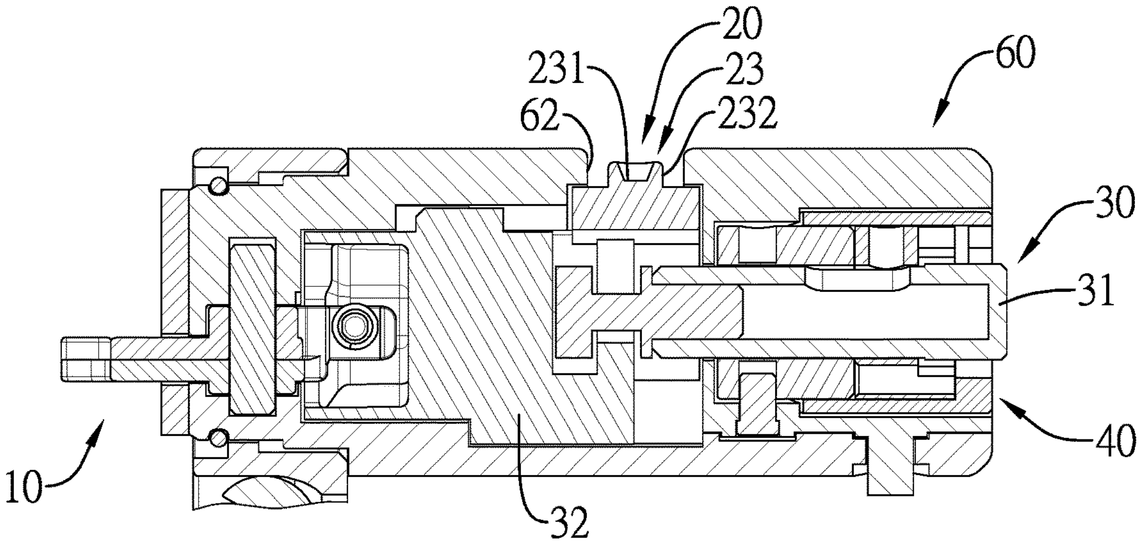
FIGS. 14 and 15 are operational cross-sectional side views of the second embodiment of the electronic device locking apparatus in FIG. 9.
Figure 15:
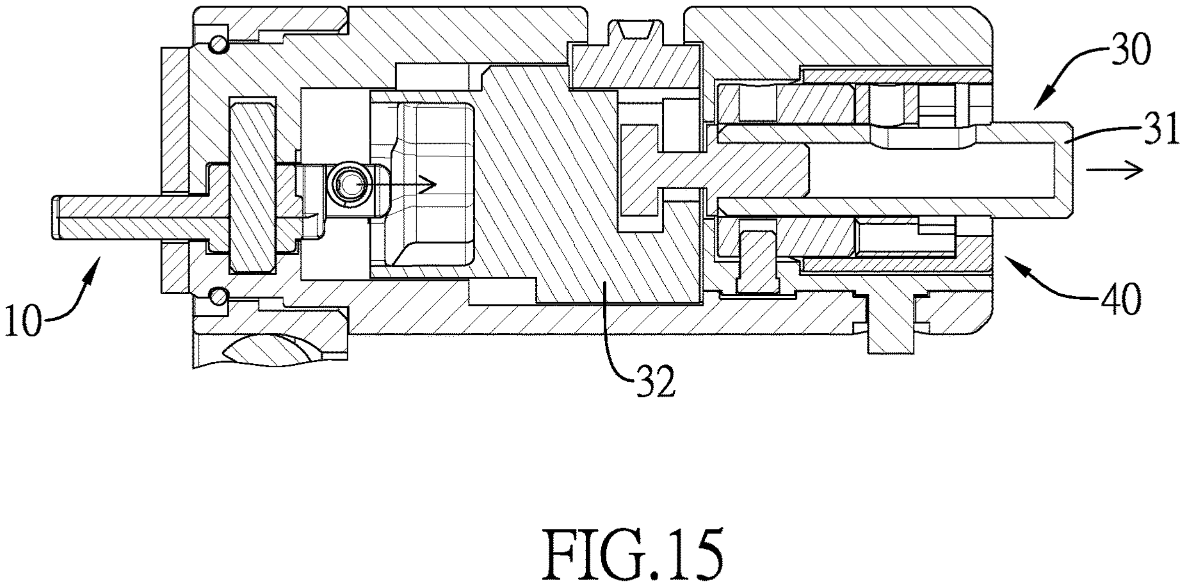
Figure 16:
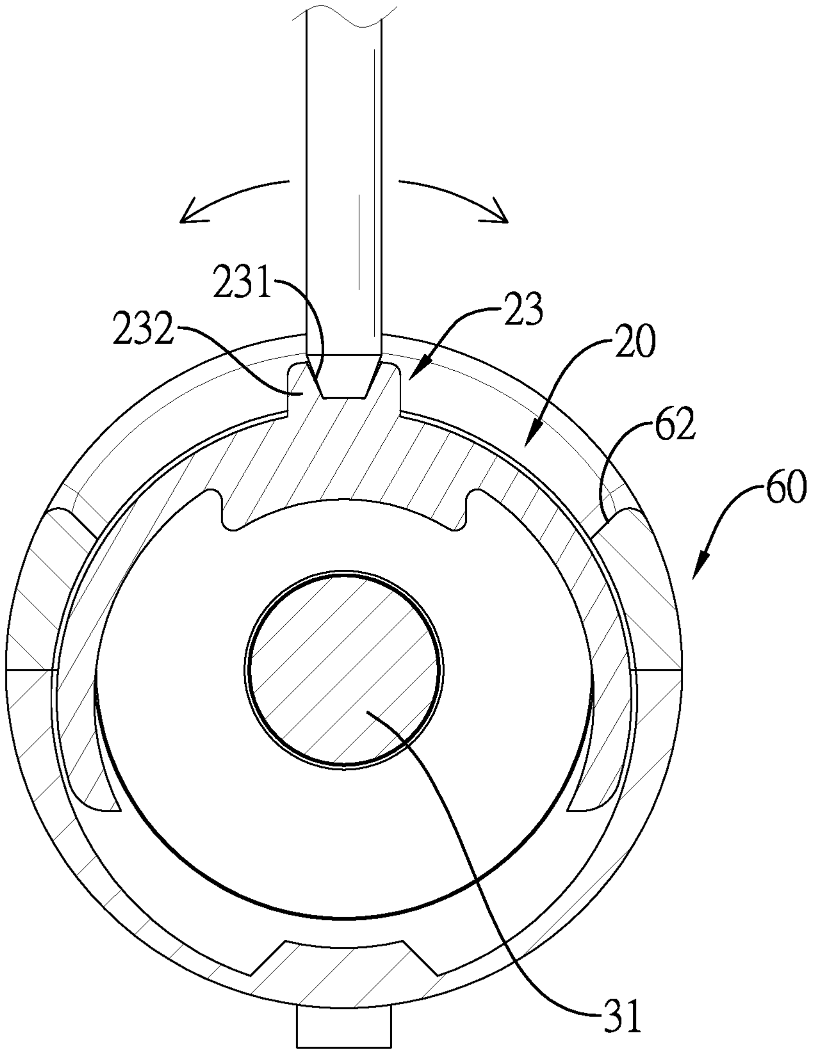
FIG. 16 is an operational cross-sectional end view of the second embodiment of the electronic device locking apparatus in FIG. 9.

First, with reference to FIGS. 10 to 12 and 14, the central shaft 31 in the second embodiment may be regarded as part of the lock 40. The central shaft 31 axially protrudes out of two ends of the lock 40. The central shaft 31 and the rotating member 32 are two independent parts, and the rotating member 32 is rotatable relative to the central shaft 31. The anti-theft-hole-fixing member 10 may also be switched to the other working stages when the rotating member 32 is rotated, as shown in FIGS. 12 and 13. When unlocked, the central shaft 31 departs from the anti-theft-hole-fixing member 10 and protrudes out of the lock 40, as shown in FIG. 15. When locking, just directly press the central shaft 31 toward the anti-theft-hole-fixing member 10, then the lock 40 is switched to a locking state following movement of the central shaft 31, and the central shaft 31 is fixed at a position for pushing the rotating member 32 as shown in FIG. 14. When unlocked, such as axially inserting a key into the lock 40 and turning the key, the central shaft 31 rebounds and pulls the rotating member 32 away from the anti-theft-hole-fixing member 10 as shown in FIG. 15. Thus, there is no unlocking member 50 in the second embodiment, the lock 40 performs the unlocking function instead.

Figure 10:
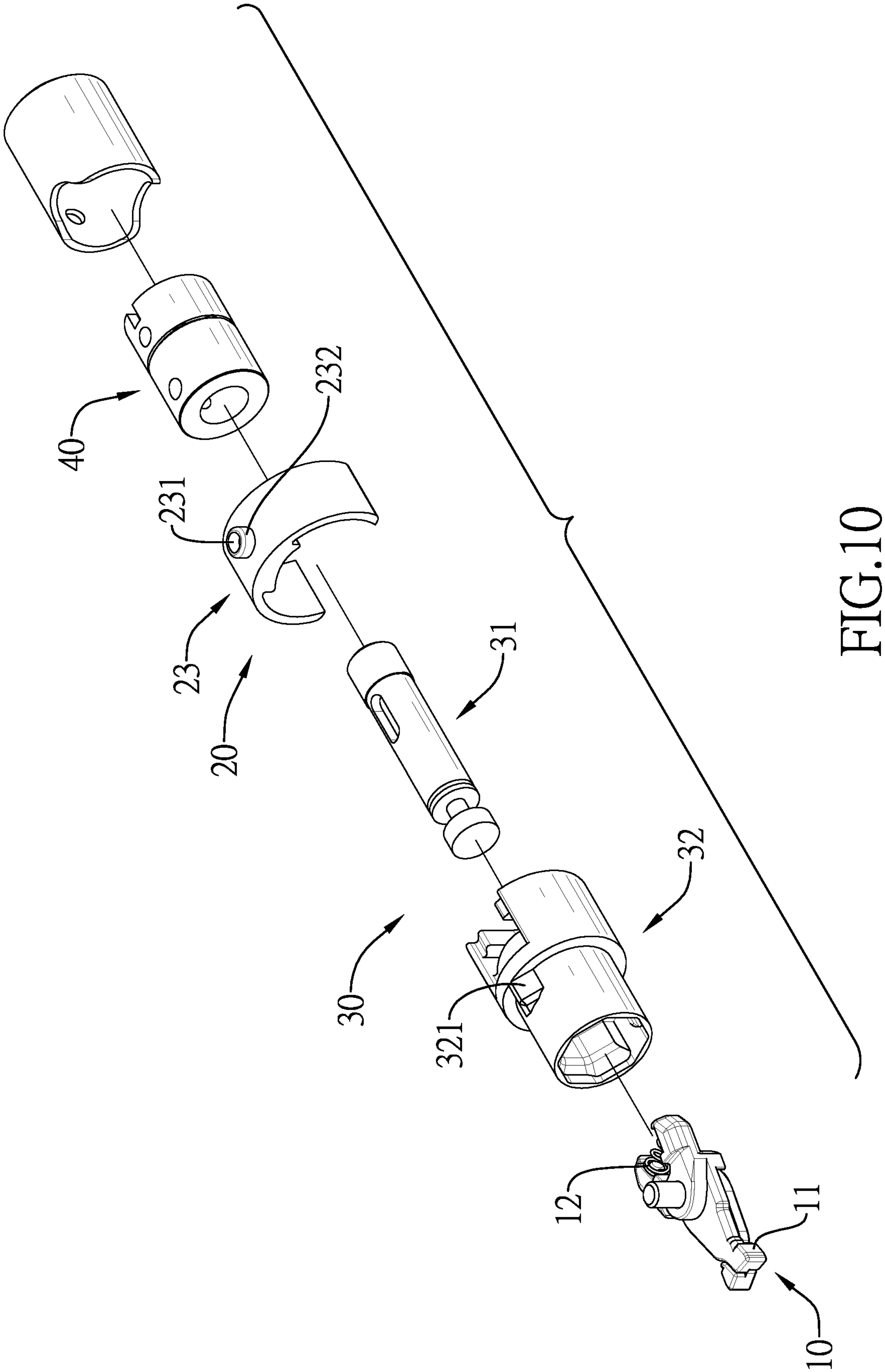
FIGS. 10 and 11 are partial exploded perspective views of the second embodiment of the electronic device locking apparatus in FIG. 9.
Figure 11:
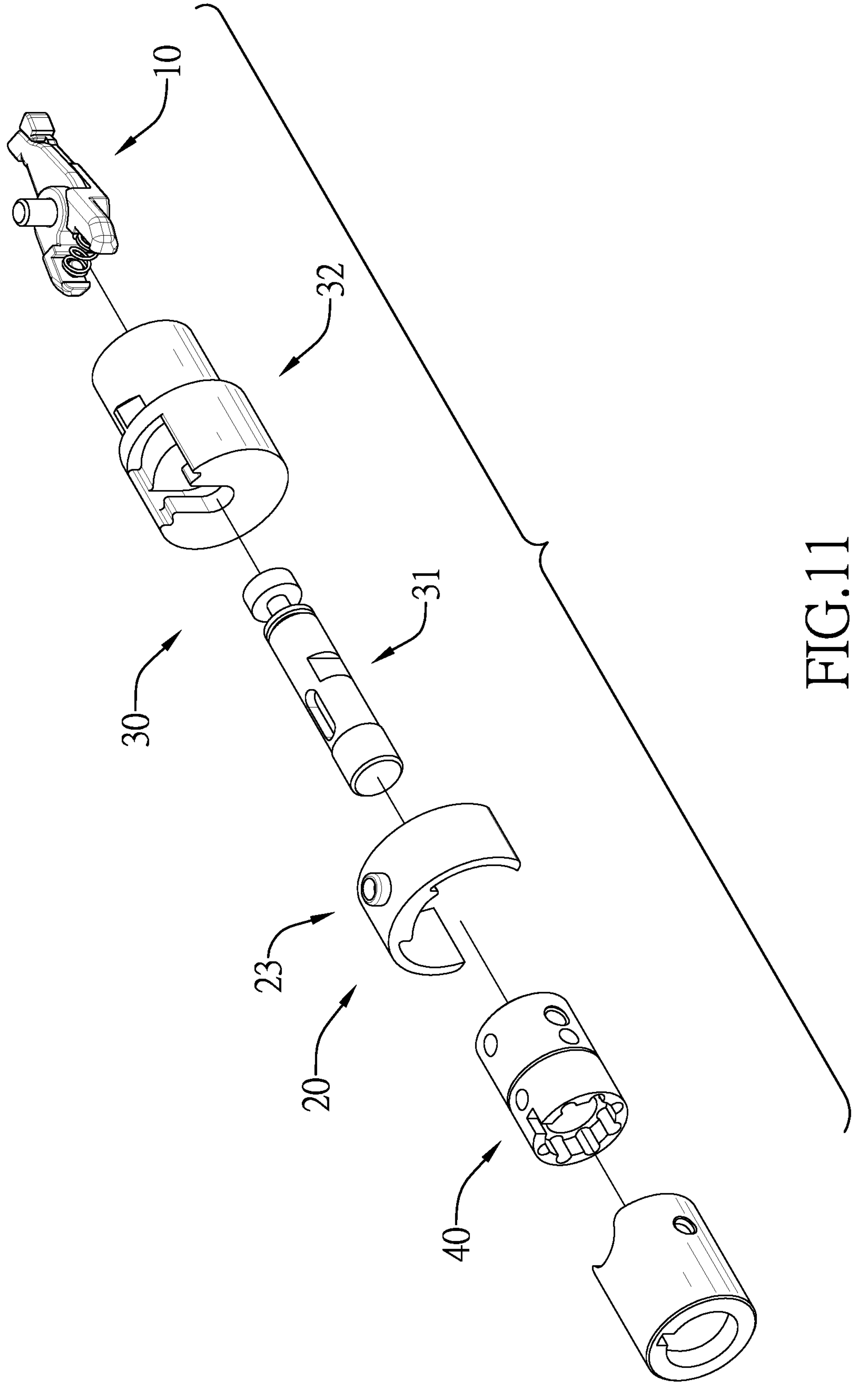

Second, with reference to FIG. 10, in the second embodiment, when the central shaft 31 pushes the rotating member 32 to be mounted around the anti-theft-hole-fixing member 10, an engaging portion 321 formed on an outer side surface of the rotating member 32 engages with one of multiple engaging portions formed on an inner side surface of the housing 60, such that the rotating member 32 is unable to rotate. When the rotating member 32 moves away from the anti-theft-hole-fixing member 10, the rotating member 32 disengages from the engaging portions of the housing 60, such that the rotating member 32 is rotatable to switch the working stages.

Third, with reference to FIGS. 9, 10, 14 and 16, the operating hole 62 and the tool operated portion 23 are disposed on a radial outer side surface of the housing 60. The way to operate the tool operated portion 23 is to pull the tool operated portion 23 with the tool. Preferably, the tool pulls the tool operated portion 23 to move around, so as to rotate the rotating member 32 to switch the working stages. In addition, the tool operated portion 23 has a protrusion 232 (preferably cylindrical), and the recess 231 (preferably a round indentation) is disposed at a center of the protrusion 232. Thus, the tool is able to be mounted around the protrusion 232 or inserted in the recess 231, so as to rotate the rotating member 32.

Figure 17:
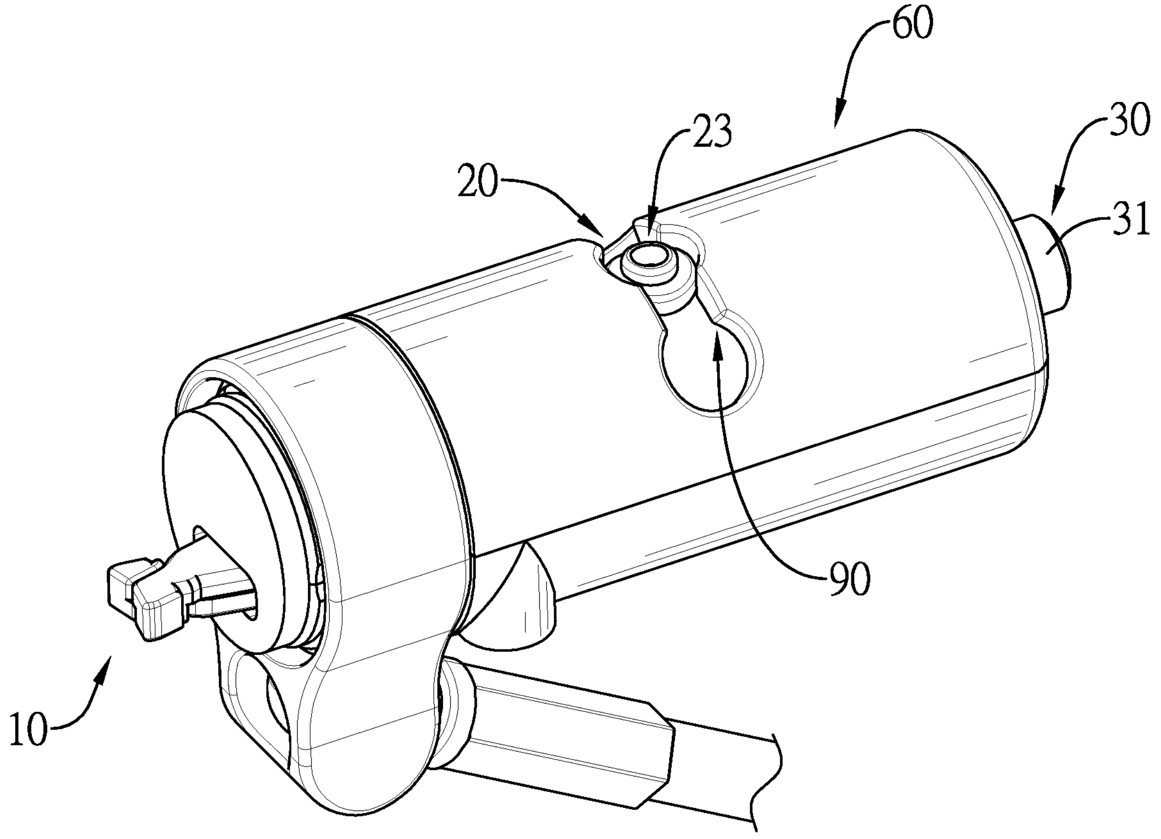
FIG. 17 is a perspective view of a third embodiment of a tool-adjustable electronic device locking apparatus in accordance with the present invention.
Figure 18:
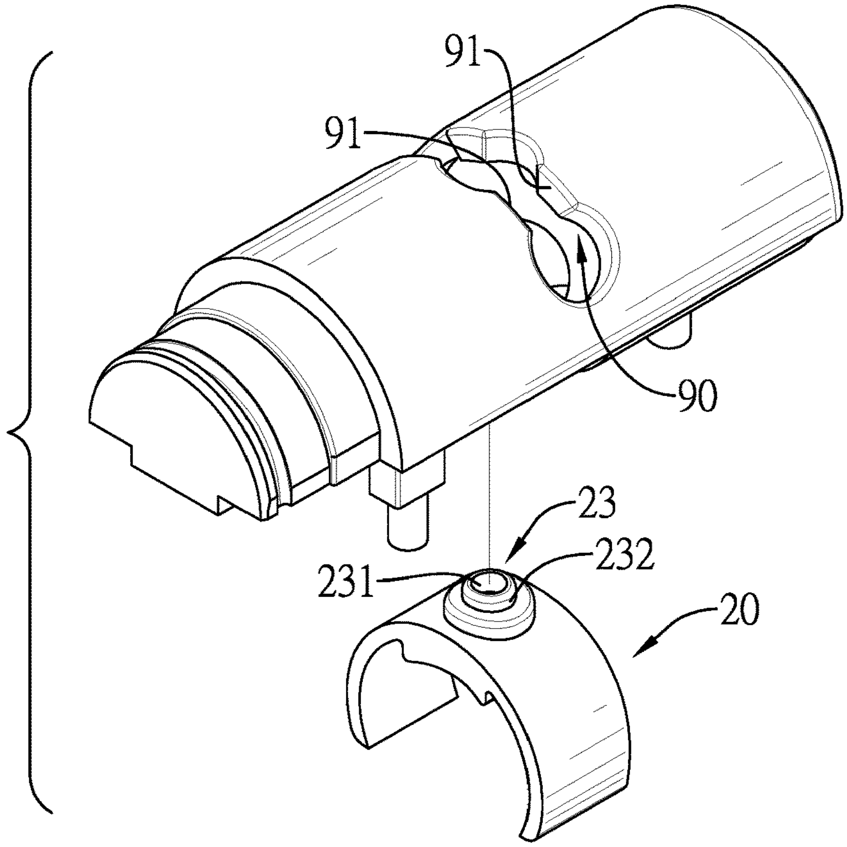
FIG. 18 is a partial exploded perspective view of the third embodiment of the electronic device locking apparatus in FIG. 17.
Figure 19:
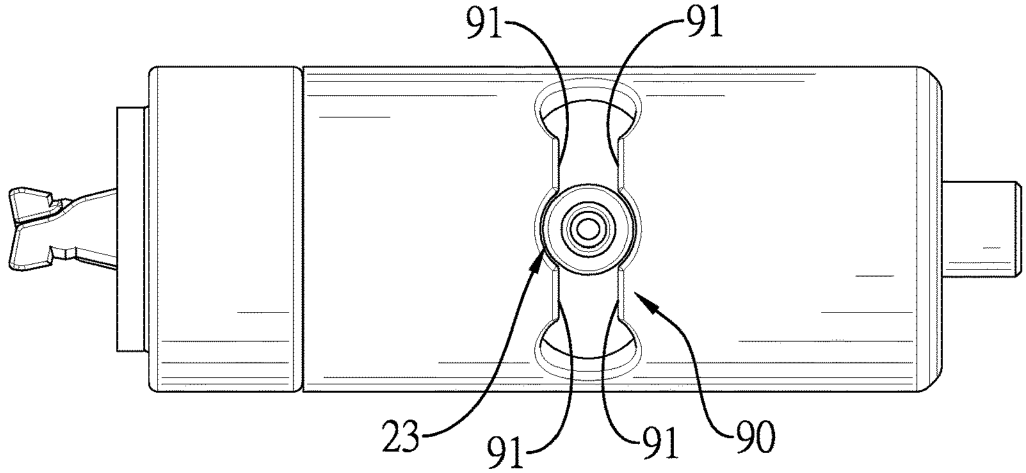
FIG. 19 is a top view of the third embodiment of the electronic device locking apparatus in FIG. 17.
Figure 20:
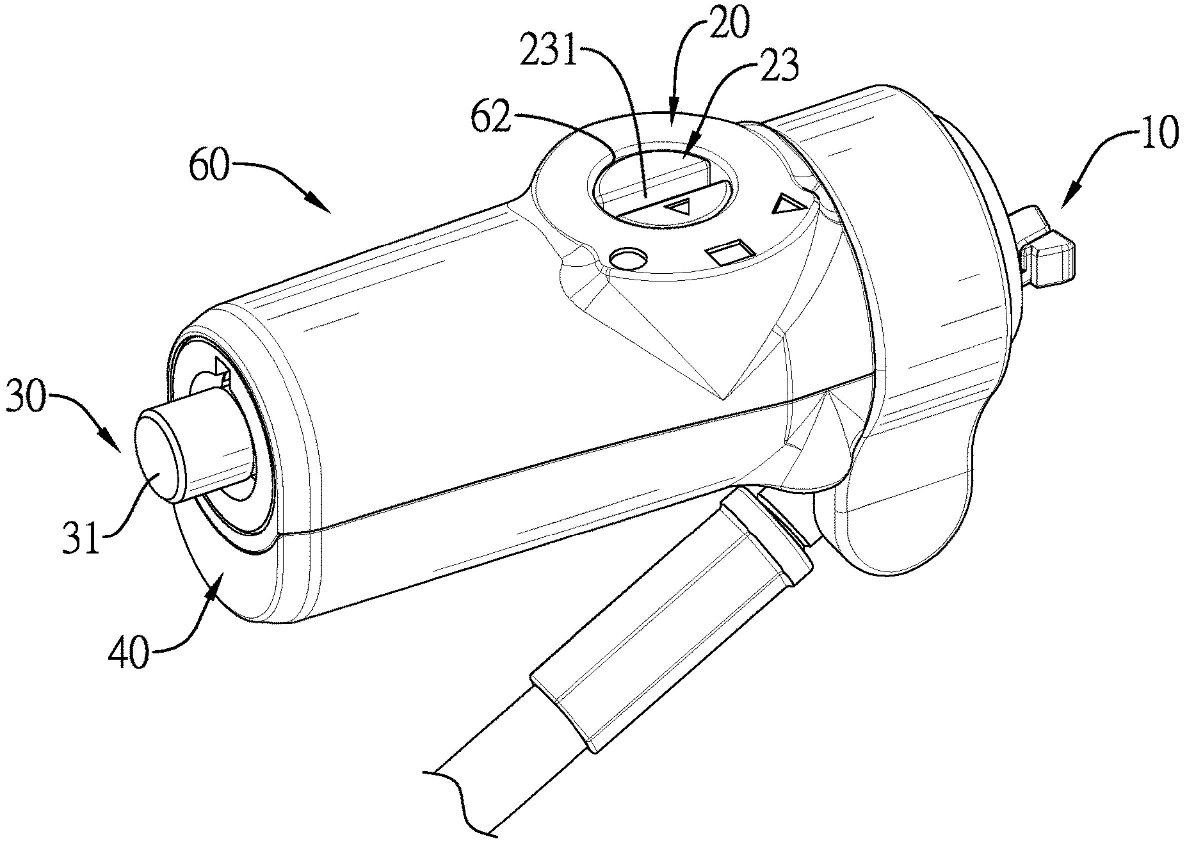
FIG. 20 is a perspective view of a fourth embodiment of a tool-adjustable electronic device locking apparatus in accordance with the present invention.
Figure 21:
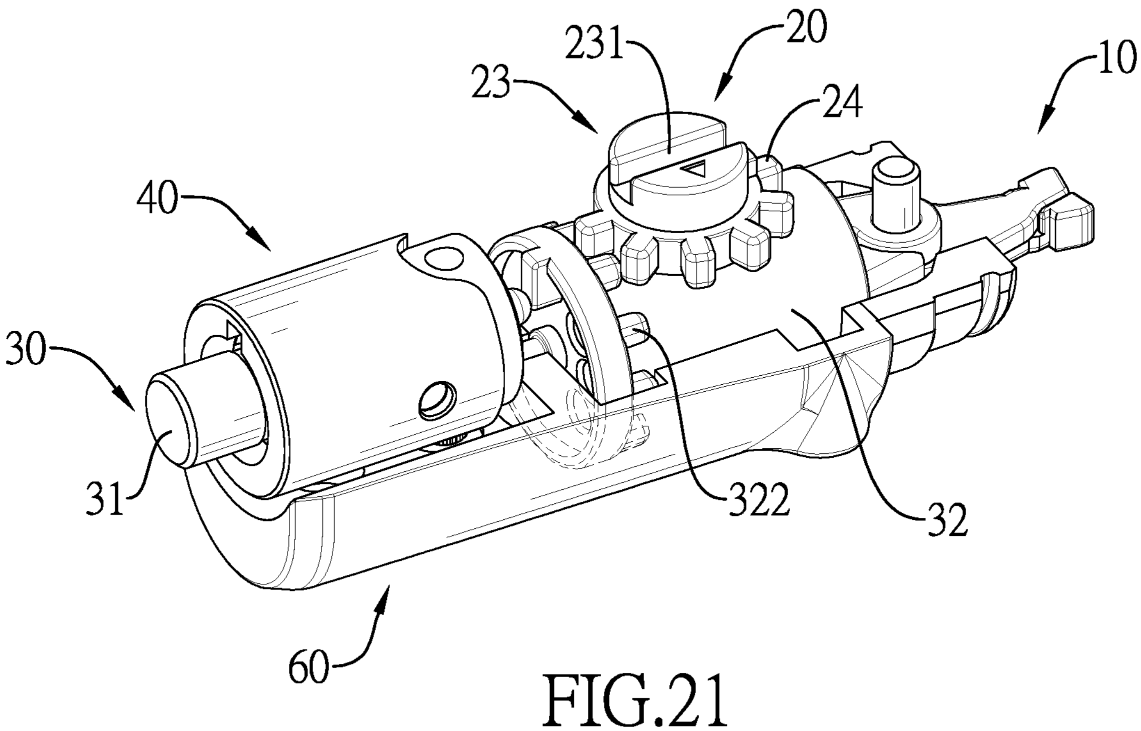
FIGS. 21 and 22 are operational perspective views of the fourth embodiment of the electronic device locking apparatus in FIG. 20.
Figure 22:
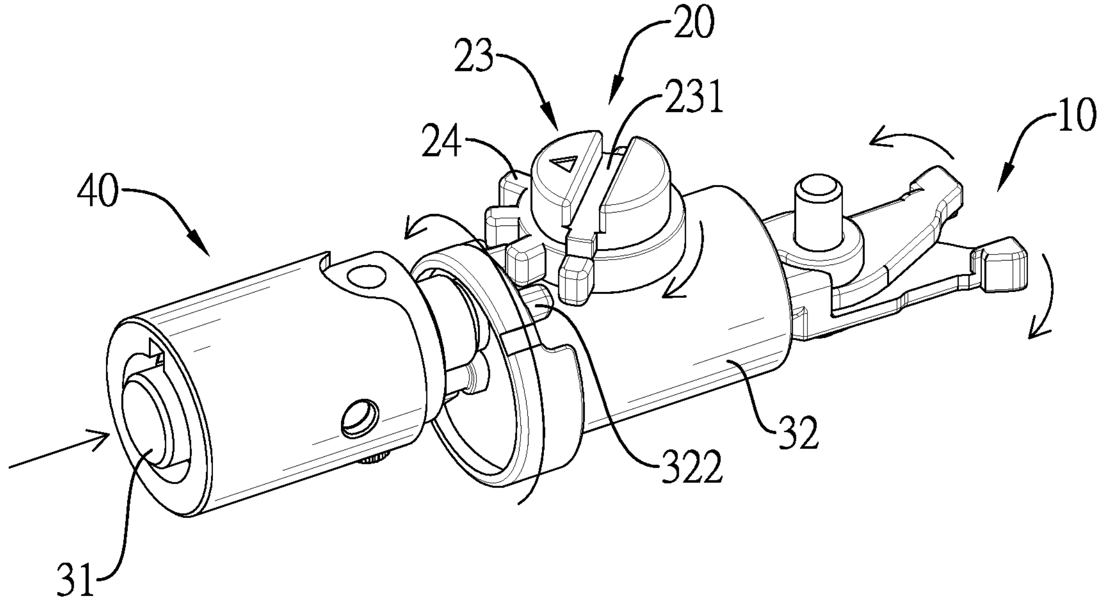
Figure 23:
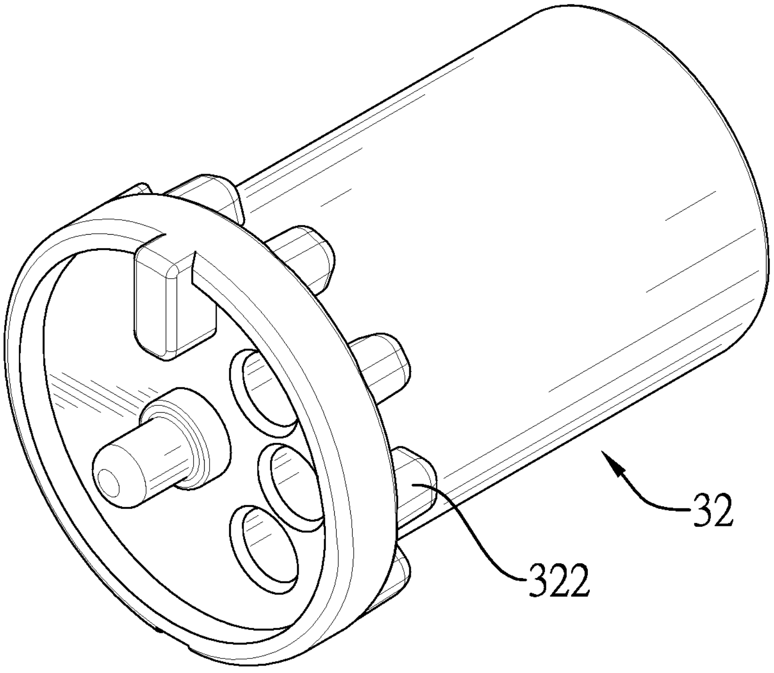
FIG. 23 is a perspective view of a rotating member of the fourth embodiment of the electronic device locking apparatus in FIG. 20.

With reference to FIGS. 17 to 19, a third embodiment of the present invention is shown and is similar to the second embodiment. The main differences therebetween are as follows.

In the third embodiment, a fixing mechanism 90 is further provided, is connected to the stage adjusting mechanism 20, tends to prevent the tool operated portion 23 from being operated, and tends to prevent the stage adjusting mechanism 20 from adjusting the working stages. Preferably, the fixing mechanism 90 is formed on an inner side surface defined around the operating hole 62. Thus, the tool operated portion 23 tends to be positioned at one of multiple positions (or angles), so as to prevent the tool operated portion 23 from being pulled or moved around (or rotated) easily. Preferably, the fixing mechanism 90 may be formed as multiple projections 91 that protrude from the inner side surface defined around the operating hole 62, so as to prevent the tool operated portion 23 from moving (or rotating). In other embodiments, the fixing mechanism 90 may be formed on the inner side surface defined around a round operating hole 62, so as to prevent the tool operated portion 23 in the operating hole 62 from being rotated.

With reference to FIGS. 20 to 23, a fourth embodiment of the present invention is shown and is similar to the second embodiment. The main differences therebetween are as follows.

First, the tool operated portions 23 in the fourth embodiment and in the first embodiment are the same. The way to operate the tool operated portion 23 is to rotate the tool operated portion 23 with the tool. Specifically, a rotational axis of the tool operated portion 23 and a rotational axis of the rotating member 32 are non-parallel and preferably are perpendicular with each other. The stage adjusting mechanism 20 is provided with multiple teeth 24 that protrude and are arranged around. The rotating member 32 is also provided with multiple teeth 322 that protrude and are arranged around. When the tool operated portion 23 is rotated by the tool, the tool operated portion 23 drives the whole stage adjusting mechanism 20 to rotate and rotates the rotating member 32 through the teeth 24, 322 that engage with each other, so as to switch the working stages.

Second, the rotating member 32 in the fourth embodiment is modified to rotate in place without moving. The rotating member 32 is the second embodiment folds the anti-theft-hole-fixing member 10 when the rotating member 32 has been moved away from the anti-theft-hole-fixing member 10. However, in the fourth embodiment, when the rotating member 32 has been rotated to specific angles, the inner side surface of the rotating member 32 forces the anti-theft-hole-fixing member 10 to be folded. In addition, rather than push the rotating member 32, the central shaft 31 (or the central shaft 31 may be regarded as the engaging member 41 of the lock 40, then there would be no central shaft 31) engages with the rotating member 32 after been moved, so as to prevent the rotating member 32 from rotating. Thus, the working stages cannot be switched or the anti-theft-hole-fixing member 10 cannot be folded.

The tool-adjustable electronic device locking apparatus of the present invention is not limited to the aforementioned four embodiments, and the essential elements in the four embodiments are exchangeable. For instance, the tool operated portion 23 that rotates may be disposed on one of the ends, which are defined along the axial direction, of the housing 60 or on the radial outer side surface of the housing 60, and the tool operated portion 23 that is pulled may also be disposed on one of the ends, which are defined along the axial direction, of the housing 60. Moreover, the tool operated portion 23 that is pulled is not limited to rotate around, and the tool operated portion 23 may be pulled to move linearly to adjust the working stages. In addition, the fixing mechanism 90 in the third embodiment may be incorporated into other embodiments, and the fixing mechanism 90 is not limited to be formed on the housing 60 and may be an independent mechanism. Moreover, in the foregoing embodiments, each of the tool operated portions 23 has the recess 231. However, the tool operated portion 23 is not limited to have the recess 231 and can only have structures such as the protrusion 232 (even non-cylindrical) as long as the tool operated portion 23 can be operated by the tool. Furthermore, the tool may be common commercial tools and may also be specially designed for the tool operated portion 23. Last, in the foregoing embodiments, the tool operated portion 23 does not protrude out of the operating hole 62. However, the tool operated portion 23 may protrude out of the operating hole 62 if necessary.

In the tool-adjustable electronic device locking apparatus of the present invention, the working stages are adjusted through the tool by setting the tool operated portion 23 on the stage adjusting mechanism 20. In this way, various kinds of touches can be effectively avoided so as to prevent the working stages from being changed accidentally, and easy adjustment of the working stages can also be avoided. Accordingly, an anti-theft effect of the present invention can be enhanced.

The tool operated portion 23 in the present invention can be operated to adjust the working stages by the tool. However, it is not limited that the tool operated portion 23 can only be operated with the tool. Under certain specific situations, the tool operated portion 23 can be operated manually. Said specific situation is like when the tool operated portion 23 is disposed in a position that is not easy to operate the tool operated portion 23 with hands but is still barely accessible. For instance, when the tool operated portion 23 is disposed in but does not protrude out of the operating hole 62, the tool operated portion 23 is not easily accessible but can still be operated with fingertips or fingernails. The objective of the present invention can also be achieved in this way. For instance, the slotted recess 231 in the first and fourth embodiments allows the tool operated portion 23 to be rotated with the fingernails, and with the fingertips protruding into the elongated operating hole 62 in the second embodiment, the protrusion 232 of the tool operated portion 23 may be pushed. However, even if the tool operated portion 23 can be operated manually, it is still difficult and requires deliberate operation to switch the working stages. Thus, the possibility of accidentally switching the working stages can still be reduced. In other words, the tool-adjustable electronic device locking apparatus of the present invention means that it can be adjusted by the tools, but not limited to those that can only be adjusted by the tools.

However, the tool operated portion 23 is not limited to the form as described above. Under certain specific situations, the tool operated portion 23 may be designed as that the tool operated portion 23 is unable to be operated with bare hands and can only be operated with the tools, so as to ensure that the working stages would not be switched easily. For instance, in the third embodiment, with the fixing mechanism 90 stopping the tool operated portion 23 from moving, the working stages can only be switched through the tools.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A tool-adjustable electronic device locking apparatus comprising:
- a housing;
- an anti-theft-hole-fixing member protruding out of the housing;
- a stage adjusting mechanism configured to adjust the electronic device locking apparatus to multiple working stages and including
  - a tool operated portion exposed to an outside of the housing and operated to adjust the working stages to which the stage adjusting mechanism adjusts through a tool; and
- a rotatable driving mechanism including a central shaft which is spring biased against said tool operated portion and linearly displaceable in relation to said anti-theft-hole-fixing member, and to selectively unfold the anti-theft-hole-fixing member for engagement in the anti-theft hole based on a selected working stage responsive to a rotation of said central shaft;
- wherein the movement of the central shaft toward the anti-theft-hole-fixing member drives the anti-theft-hole-fixing member to unfold for engagement in the anti-theft hole based upon the selected working stage.

2. The tool-adjustable electronic device locking apparatus as claimed in claim 1, wherein the tool operated portion is rotated to adjust the working stages to which the stage adjusting mechanism adjusts through the tool.

3. The tool-adjustable electronic device locking apparatus as claimed in claim 1, wherein
- an axial direction and a radial direction that are perpendicular to each other are defined on the housing; and
- the tool operated portion and the anti-theft-hole-fixing member are disposed on two opposite ends, which are defined along the axial direction, of the housing.

4. The tool-adjustable electronic device locking apparatus as claimed in claim 1, wherein
- the housing has an operating hole; and
- the tool operated portion corresponds in position to the operating hole and does not protrude out from the operating hole.

5. The tool-adjustable electronic device locking apparatus as claimed in claim 1, wherein a recess is formed in the tool operated portion and is for the tool to be inserted in the recess and to operate the tool operated portion.

* * * * *